Dec. 15, 1959     G. PREIS     2,916,800
DEVICE FOR FINISH ROLLING OF CYLINDERS
Filed April 22, 1953     2 Sheets-Sheet 1
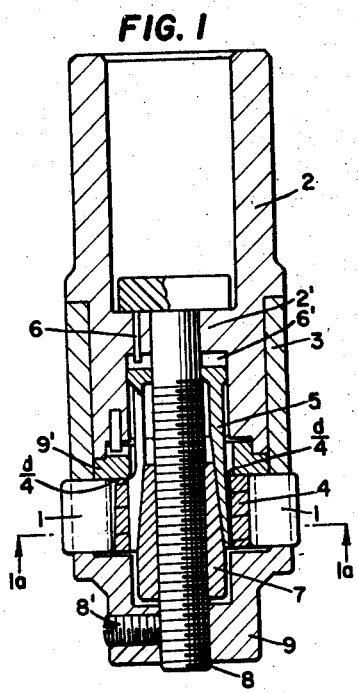
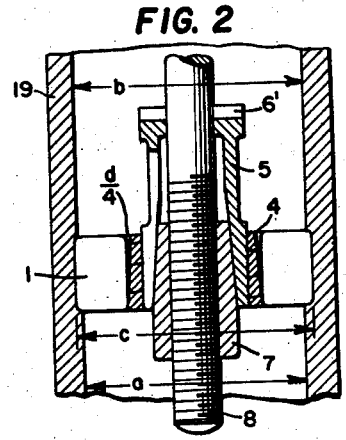
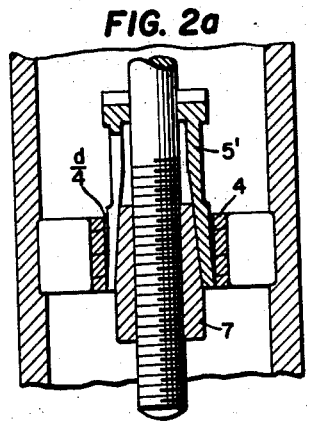
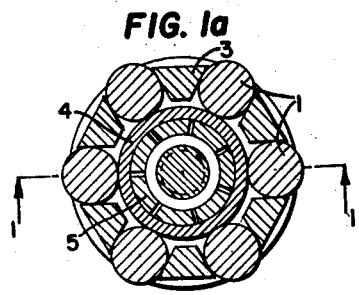
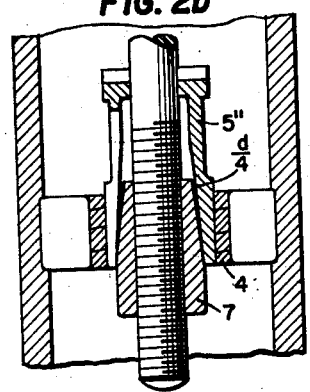
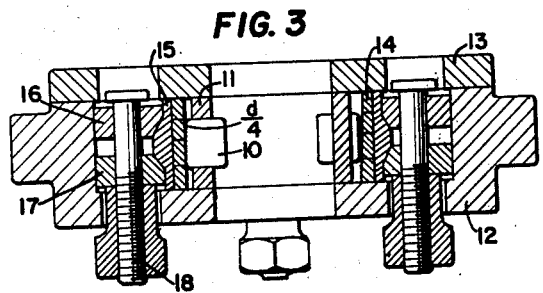
Inventor:
GEORG PREIS
BY Inventor:
GEORG PREIS
BY:

United States Patent Office 2,916,800
Patented Dec. 15, 1959

2,916,800

DEVICE FOR FINISH ROLLING OF CYLINDERS

Georg Preis, Berlin, Germany

Application April 22, 1953, Serial No. 350,293

12 Claims. (Cl. 29—33)

The present invention relates to a device for finish rolling of cylinders accurately to size by means of cylindrical rollers which are arranged along a circle and the position of which is adjustable to the desired diameter to which the cylinder has to be finished. The cylindrical rollers turn in or on an expanding roller race and it is an essential feature of the device of the present invention that the expanding roller race has substantially cylindrical inner and outer surfaces and rests in or on an expanding clamping sleeve. Furthermore, an axial sliding clamping cone is provided by means of which the diameter of the clamping sleeve and thereby also the diameter of the roller race may be adjusted. This has the advantage that the running surface of the expanding roller race, which is preferably helically slotted, while the expanding clamping sleeve is slotted in axial direction, always remains strictly cylindrical in the different positions of expansion, so that the cylinders to be worked can be finish rolled by means of the device accurately to size, and so that the rollers will not jam, which would lead to spoiling the surface to be finished.

With similar devices of this kind, however, the expanding roller race has been carried directly by the clamping cone and the former has been designed conically on the side adjacent the clamping cone, so that the supporting surface of the roller race did not remain cylindrical during expansion. With another design conical rollers run directly on a clamping cone, so that tilting of the rollers occurs during the rolling operation.

A modified embodiment of the present invention, especially for rolling of outer cylindrical surfaces, comprises a clamping sleeve furnished with two cones and variable in diameter by means of two conical discs which may be clamped axially against each other. This effects a specially compact design of the device.

The rollers are mounted for rotation about their axes and respectively spaced from each other in a roller cage. This roller cage, the roller race, the clamping sleeve and the clamping cone are preferably coaxially arranged on a hub. The roller cage and the hub form support means for turnably supporting the roller thereon.

Experience has shown that when the rollers are supported on an exactly cylindrical surface of the roller race, the tool is drawn during the rolling operation automatically into the workpiece, apparently due to the resiliency of the workpiece. This causes considerable difficulty when the tool is to be withdrawn from the workpiece in a direction opposite to the direction in which it has been fed during the rolling operation, which is necessary in many cases, especially in rolling of blind holes. In rolling tools according to the prior art, the device had to be collapsed before it could be withdrawn from a blind hole which, of course, required a new tool setting for the next rolling operation.

To overcome this disadvantage of rolling tools according to the prior art, the preferred embodiment of the present invention provides therefore for a mounting of the working rollers in such a way that these rollers press against the workpiece at one end of the roller less than at the other end thereof. In this way, the device may be withdrawn from the workpiece in a direction in which the end of the rollers pressed with lesser force against the workpiece, forms the leading end of the movement. In this way a large number of bores can be finish rolled to exact equal dimension without re-adjusting the rollers. This difference of pressure exerted by the rollers is preferably obtained by slightly tapering the roller race in the direction of the tool withdrawal, and preferably the two end diameters of the roller race differ from each other for about half of the difference between the initial diameter of the workpiece and the final finished diameter thereof to which the workpiece is to be rolled. The difference of the two diameters of the roller race is in the order of about 0.1 millimeter and this small taper, hardly perceptible with the naked eye, is sufficient for providing easy withdrawal of the tool from the workpiece.

Instead of tapering the roller race as described above, the clamping sleeve may be tapered accordingly or the two contacting surfaces between the clamping sleeve and the clamping cone may be formed with a slightly different taper and in this way the roller race may be expanded to a slightly tapered shape.

Another preferred embodiment of the present invention comprises two sets of rollers, arranged spaced in the longitudinal direction of the axis on the supporting hub. The set of rollers which contacts the workpiece during the rolling operation first, is set to produce a diameter between the initial diameter of the workpiece and the finished diameter, whereas the other of the set of rollers is set to produce on the workpiece the finished diameter. The finished diameter is thereby produced in two successive steps, which results in a specially perfect surface of the finished workpiece.

The set of rollers contacting the workpiece first is preferably held on a non-variable roller race, while the second set of rollers is preferably set on an expandable roller race as described above.

Instead of providing two set of rollers which finish-form the exact diameter of the workpiece by two successive roller operations, the first set of rollers may also be provided with cutting edges, whereby the workpiece is first machined by these cutting edges of the first set of rollers to a semi-finished diameter. The cutting rollers have preferably diameters differing slightly from each other, but their axis are respectively spaced from the axis of the hub on which these rollers are supported in such a way that the rollers will machine a perfect cylinder on the workpiece. Preferably, these cutting rollers are connected together for simultaneous rotation by pinions respectively keyed to their shaft and a gear mounted on the hub meshes with all the pinions of the cutting rollers to thereby couple the rollers for simultaneous rotation.

The drawings show embodiments of the invention.

Fig. 1 is a longitudinal section of the device of the present invention for finish rolling of bore holes, the section being taken along the lines 1—1 in Fig. 1a, and viewed in the direction of the arrows;

Fig. 1a is a sectional view of the device shown in Fig. 1, the section being taken along the lines 1a—1a in Fig. 1, and viewed in the direction of the arrows;

Fig. 2 is a simplified sectional view of the device shown in Fig. 1 with the device located in a bore to be finish rolled;

Fig. 2a is a sectional view similar to Fig. 2 showing a modification of the device;

Fig. 2b is a sectional view similar to Fig. 2 showing a further modification of the device;

Fig. 3 is a longitudinal section through a modification of the device of the present invention and showing a device for finish rolling the outer surface of a cylinder;

Figure 4:
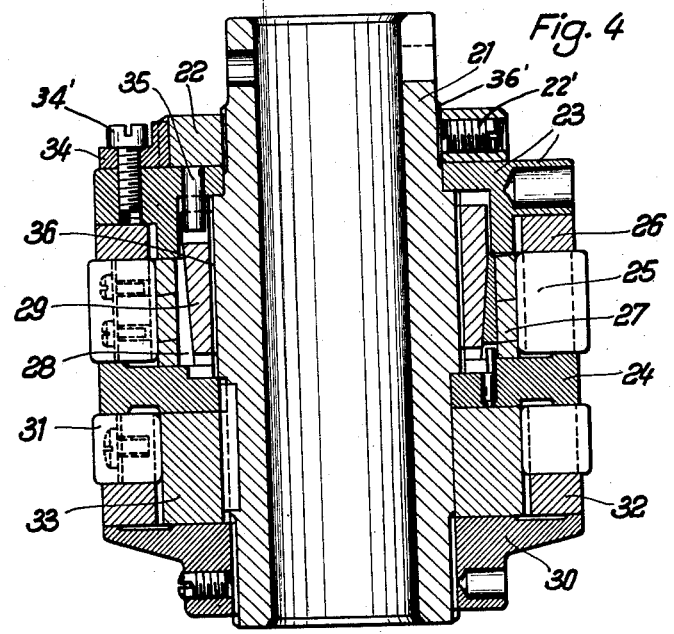
Fig. 4 is a longitudinal section of a further modification of the device of the present invention and showing two sets of rollers for finish rolling a bore in two stages.

According to Fig. 1 rollers 1 used for rolling cylindrical inner surfaces are held by a roller cage 3 supported for rotation about its axis on a hub 2. Rollers 1 run on an expanding ring or roller race 4, which is substantially cylindrical on the inside and outside, and is preferably formed from square spring wire tightly wound into a helix. Ring 4 is on a longitudinally slotted clamping sleeve 5, which is formed conically inside. The clamping sleeve 5 is inserted in the hub 2 and is prevented from turning by a pin 6 extending into a transverse slit 6' of sleeve 5 and is adjusted in diameter by means of a clamping cone 7 and by turning of a clamping screw 8, which is axially held with its head on an inside stop of the hub and can be screwed into cone 7. A cover plate 9 is screwed on the screw 8 and can be fixed by means of a screw set 8' or the like, and it serves to prevent the roller cage 3, the rollers 1, the expanding ring 4 serving as a roller race and the clamping sleeve 5 from falling off the hub. The clamping screw 8 can be screwed up in the clamping cone 7 by means of a socket wrench from the interior of the hub. A flange 9' is inserted into the hub 2 for guiding the upper side of rollers 1, as viewed in Fig. 1.

Fig. 2 shows the same device working in a cylinder 19, omitting, however, for reasons of simplification several parts shown in Fig. 1.

If the initial diameter of the cylinder before rolling amounts to $a$ and the rollers are set to a diameter $c$, then the finished diameter $b$ of the cylinder is slightly less than $c$ on account of the resiliency of the workpiece and for example by about 0.1 mm. larger than $a$. The difference between $a$ and $b$ may be called $d$. Now, to enable easy withdrawal of the tool with the rollers 1 out of the bore, for instance of a blind hole, without readjusting the clamping cone 7, the diameter of the outer surface of the expanding ring 4 is made smaller at the end leading in the direction of withdrawal than at the other end by about half the difference in measurement between initial diameter and finished diameter, e.g. by about $d/2$, in such manner that the rollers end press at their ends leading in direction of withdrawal less against tube 19 than at the other end. This taper can be ground off the expanding ring 4, as shown in Figs. 1 and 2, or as shown in Fig. 2a, the expanding sleeve 5 or off the clamping cone 7 may be ground with a taper slightly different than the taper on the inner surface of sleeve 5, so that slightly conical gaps appear respectively between the adjacent surfaces as shown strongly exaggerated in Figs. 1, 2a and 2b. Figs. 2a and 2b show slight modifications of the device illustrated in Fig. 2, whereas in Fig. 2 the outer surface of the clamping sleeve 5 which supports the roller race 4 is substantially cylindrical, the outer surface of the clamping sleeve member 5' shown in Fig. 2a is conical so that a tapering gap is formed between the roller race 4 and the clamping sleeve 5' as can be clearly visualized from Fig. 2a. The arrangement shown in Fig. 2b differs from the above discussed arrangements insofar as the inner surface of the clamping sleeve member 5" is formed with a taper greater than the taper on the clamping cone member 7 so that a tapering gap is formed between the clamping sleeve 5" and the clamping cone member 7. The effect is the same with all three designs, the small differences in diameter being transmitted elastically from the clamping cone to the outer acting surface of the rollers 1.

According to Fig. 3 rollers 10 serving for rolling cylindrical outer surfaces are supported in a roller cage 11, which is held between a hub 12 and a face washer 13. An expansion ring 14, formed from square spring wire tightly wound into a helix, in which the rollers 10 rotate, is encased by a clamping sleeve 15, which may be varied in diameter by means of oppositely tapered discs 16 and 17 which may be moved towards each other by means of clamping screws 18. The clamping sleeve 15 consists of highly elastical metal and is slotted (not shown), in case of need, longitudinally from both ends alternately in order to obtain sufficient tractility. It may also be composed of several ring parts or may be cut through longitudinally on one place.

To enable withdrawal of the tool from the work piece the roller race 14 is widened here towards the exit end of the rollers, that is the end leading in direction of withdrawal of the tool, by $d/2$, so that a gap $d/4$ appears between the roller race and the rollers 10.

According to Fig. 4 a plurality of rollers 25 are supported for rotation about their axes in a roller cage 26 which in turn is turnably mounted between an end washer 22, a pressure disc 23 and intermediate washer 24, on a hub 21. Hub 21 is provided with a bore passing through it for reception of an operating spindle. The rollers 25 revolve round an expanding roller race 27, which can be varied in diameter by means of a clamping sleeve 28 and a clamping cone 29 so that the finished diameter of the workpiece produced by the tool can be adjusted. A set of rollers 31, adjusted to semi-finish measurement of the bore to be produced, is mounted in a roller cage 32 which, in turn, is contained turnable between an end disc 30 and the intermediate washer 24. The rollers 31 revolve about a ring 33, not variable in diameter and held on the hub 21 by keying.

The end plate 22 is screwed on external threads 36' on the hub 21 and stationarily held on this hub by means of the set screw 22'. The pressure disk 23 is normally held against rotation on the hub 21 by a key 34 engaging in a longitudinal slot of the end plate 22 and held on the pressure disk 23 by a screw 34'. If the diameter to be produced by the set of rollers 25 has to be adjusted, the screw 34' is screwed out of the pressure disk 23 and the key 34 is removed from the longitudinal slot in the end plate 22. The pressure disk 23 can now be turned, and turning of the pressure disk 23 will also cause turning of the cone 29, since these two elements are connected together for simultaneous rotation by the pin 35 engaging in a cutout in the upper portion of cone 29. The cone 29 is provided with an internal screw thread which engages an external screw thread 36 on the hub 21, and therefore turning of the cone 29 will move the same, depending on the direction of rotation, in or out of the clamping sleeve 38. The set of rollers 25 is thereby adjusted to produce a larger or smaller diameter.

The way of operation is the following: the tool fastened on an operating spindle is pressed with the set of rollers 31, adjusted to semi-finish measurement, into the correspondingly premachined bore in revolving condition, so that the rollers 31 expand the bore's dimension to a semi-finish dimension. As soon as the second set of rollers 25 is pressed into the prepared bore, the finish dimension is prepared by the rollers 25 by plastical shaping.

Figure 5:
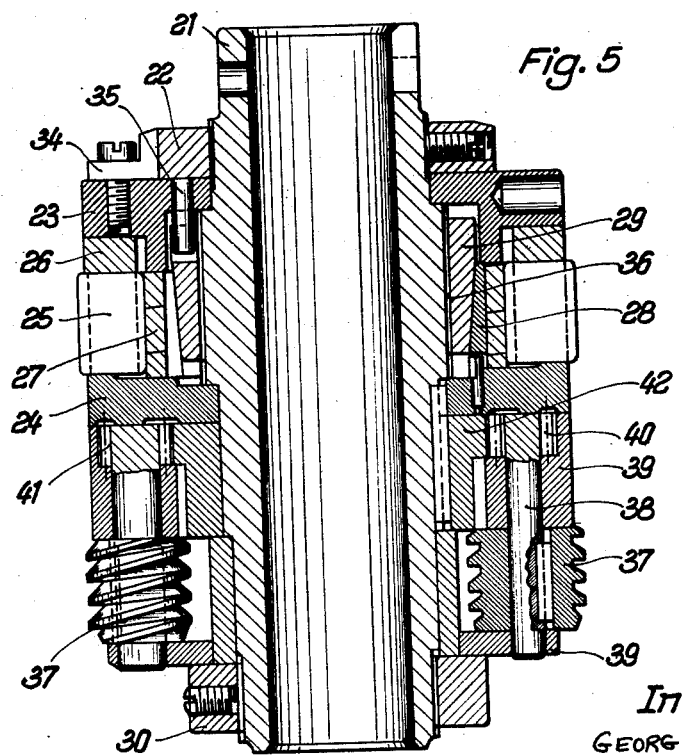
Fig. 5 is a longitudinal section of a further modification of the device of the present invention, this device being also provided with two sets of rollers one of which is provided with cutting edges.

According to Fig. 5 the arrangement of the set of rollers adjusted to the finished dimensions of the bore to be rolled is the same as according to Fig. 4. Here the set of rollers 37, working to semi-finish measurement, is provided respectively with cutting edges which may be helically shaped or which may be arranged in a plurality of cutting edges distributed about the roller surface and inclined to the roller axis respectively. The rollers 37 are fastened to pinion shafts 38 by means of keying, these shafts being turnably supported in a roller cage 39 and rotating with their pinions 40, 41 during the working process on the spur wheel 42 fastened to the hub 21, thus being connected to each other for simultaneous rotation.

The way of operation differs from the way of operation of the device according to Fig. 4 only in that the set of rollers adjusted to semi-finish measurement premachines the bore by cutting. The cutting edges on the rollers 37 are preferably arranged along a helix as shown in Fig. 5, or a plurality of cutting edges evenly distributed about the outer surface of the roller and inclined to the roller axis may also be provided. The rollers 37 have differing diameters, but are supported in the roller cage 39 with the pinion shafts 40, 41 in such way, that their outer surfaces describe a common circumference. As soon as the device is pressed into the roughly premachined bore hole of the work piece, the rollers 37 are forced to roll along the cylindrical inner surface of the bore. While with rollers with equal diameters all rollers have a uniform angular velocity, the rollers 37 have diverse angular velocities on account of their diverse diameters. The rollers 37, being connected positively to each other by the pinions 40, 41 and gear wheel 42 and being supported jointly in the roller cage 39, get blocked in the extreme case and the cutting edges of the rollers 37 act then like a fixed turning tool, or the cutting edges act as milling cutters if a revolving movement of the roller cage 39 with the rollers 37 is effected.

The rollers 25 shown in the two embodiments illustrated in Figs. 4 and 5 are preferably mounted on their respective roller races in the manner described above so as to produce during rolling a greater pressure on one end of the roller than on the other end thereof.

The new tool makes it possible to finish roll interior and outer cylinder surfaces and also blind holes very conveniently and quickly and it can be withdrawn under all circumstances, without the pressure of the rollers onto the work piece having to be released. Therefore, many equal work pieces can be finish rolled to an equal finish measurement quickly one after the other, whereat the surface of the work piece is hardened up to a certain depth and is clearly smoothed furthermore, so that finish grinding and the like can be dispensed with.

I claim:

1. A device for finish rolling a cylindrical surface accurately to size, comprising, in combination, a roller race member of adjustable diameter having outer and inner roller race faces; cylindrical rollers for finish rolling said cylindrical surface while being fed in one direction along the axis of said cylindrical surface, said cylindrical rollers being distributed about the axis of said race and running on one of said roller race faces thereof; a clamping sleeve member having inner and outer faces one of which is conical and the other of which is cylindrical, the latter face supporting said roller race member and engaging the same at the other of said roller race faces thereof; an axially sliding clamping cone member, said clamping cone member having a conical face engaging said conical face of said clamping sleeve member for adjusting the diameter of said sleeve member and said roller race member and thereby positioning said rollers according to the finish diameter of the cylinder to be rolled, one of said members being formed along one of said faces thereof with a relief taper for pressing the edge portions of said rollers leading in said one direction with greater pressure against said cylindrical surface than said trailing edge portions thereof so that said device may be easily withdrawn from said cylindrical surface in a direction opposite to said one direction; and support means supporting said rollers for running on said one face of said race.

2. Device as claimed in claim 1, wherein the support means include a hub having a bore passing therethrough in longitudinal direction thereof.

3. A device as claimed in claim 1, wherein the diameter at one end of one of said faces of said roller race member is larger than the diameter at the other end thereof by about half of the difference between the initial diameter and the finish diameter of the cylindrical surface to be finish rolled by the device so that said face of the roller race is slightly tapered from said one end to said other end of said race, whereby the ends of said rollers adjacent said other end of said roller race will be, respectively, pressed less against the cylindrical surface to be rolled than the other ends thereof so that the device can be easily withdrawn from the workpiece in the direction of the taper of the roller race.

4. A device as claimed in claim 1 in which the inner face of said clamping sleeve member is conical and in which said clamping cone member is tapered in the same direction as said clamping sleeve member but to a greater extent, the difference between the smallest diameter of said clamping cone member and the diameter of said clamping sleeve member cooperating with said smallest diameter of said clamping cone member being about half the difference between the initial diameter and the finish diameter of the workpiece.

5. A device as claimed in claim 1, especially for rolling of outer cylindrical surfaces, wherein disks having respectively oppositely inclined conical surfaces are provided instead of said cone member, and wherein said clamping sleeve member is provided with two cone faces respectively engaging said surfaces of said disks; said device including further means for pressing said conical disks against each other for changing the variable diameter of said roller race.

6. A device as claimed in claim 1, wherein said support means comprises a hub and a roller cage mounted for rotation about the axis thereof on said hub, and wherein said roller race member, said clamping sleeve member and said clamping cone member are arranged coaxially with said hub.

7. A device as claimed in claim 1, in which the diameter of the outer face of the clamping sleeve member acting on one end of said roller race is larger than the diameter acting on the other end of said race by about half of the difference between the initial diameter and the finished diameter of the cylindrical surface to be finish rolled by the device, so that said outer face of said clamping sleeve is slightly tapered from one end to the other end thereof, whereby the ends of said rollers adjacent to said other end of said roller race will be, respectively, pressed less against the cylindrical surface to be rolled than the other ends thereof so that the device can be easily withdrawn from the workpiece in the direction of the taper of the roller race.

8. A device as claimed in claim 1, and including an elongated supporting hub, and in which said clamping cone member is arranged coaxially with said hub and slidable thereon in axial direction; said device including further screw means engaging said clamping cone member for adjusting the position thereof relative to the clamping sleeve member; a second roller race member mounted on said elongated supporting hub and spaced in longitudinal direction from the roller race member mounted on the clamping sleeve; and a second set of rollers mounted on said second roller race, the rollers of said second set of rollers being positioned by said second roller race according to a semi-finished diameter of the cylinder to be rolled.

9. A device as defined in claim 8 wherein said second roller race has a fixed, non-variable diameter.

10. A device as defined in claim 9, in which the rollers of said second set of rollers are provided with cutting edges, and including means connecting the rollers of said second set of rollers for simultaneous rotation.

11. A device as claimed in claim 10 in which said cutting edges are helically arranged on the outer surface of said rollers, respectively.

12. A device as defined in claim 10 and said means connecting the rollers of said second set of rollers for simultaneous rotation including a plurality of pinions respectively fixed to and coaxially arranged with said rollers, and each of said pinions having a diameter differing from the diameter of the other of said pinions, and a sun gear mounted on said supporting hub and engaging said pinions.

References Cited in the file of this patent

UNITED STATES PATENTS

| | | |
|---|---|---|
| 1,412,538 | Mills | Apr. 11, 1922 |
| 1,717,720 | Martin | June 18, 1929 |
| 2,045,787 | Maupin | June 30, 1936 |
| 2,170,631 | Cogsdill | Aug. 22, 1939 |
| 2,375,235 | Maxwell | May 8, 1945 |
| 2,600,800 | Pace | June 17, 1952 |
| 2,737,996 | Toth | Mar. 13, 1956 |

FOREIGN PATENTS

| | | |
|---|---|---|
| 16,811 | Great Britain | Oct. 1, 1892 |
| 453,124 | Germany | Nov. 29, 1927 |
| 511,113 | Germany | Oct. 16, 1930 |
| 971,254 | France | July 5, 1950 |